United States Patent
Haeger et al.

(10) Patent No.: US 12,429,577 B2
(45) Date of Patent: Sep. 30, 2025

(54) LOCATION DETERMINER

(71) Applicant: ASSA ABLOY AB, Stockholm (SE)

(72) Inventors: Mattias Haeger, Solna (SE); Anders Sahlström, Stockholm (SE); Fredrik Einberg, Huddinge (SE); Mats Cederblad, Sigtuna (SE)

(73) Assignee: ASSA ABLOY AB, Stockholm (SE)

( * ) Notice: Subject to any disclaimer, the term of this patent is extended or adjusted under 35 U.S.C. 154(b) by 317 days.

(21) Appl. No.: 18/009,278

(22) PCT Filed: Jun. 1, 2021

(86) PCT No.: PCT/EP2021/064676
§ 371 (c)(1),
(2) Date: Dec. 8, 2022

(87) PCT Pub. No.: WO2021/249828
PCT Pub. Date: Dec. 16, 2021

(65) Prior Publication Data
US 2023/0221429 A1    Jul. 13, 2023

(30) Foreign Application Priority Data
Jun. 9, 2020  (SE) .................. 2050675-4

(51) Int. Cl.
*G01S 13/76* (2006.01)
(52) U.S. Cl.
CPC .................. *G01S 13/767* (2013.01)
(58) Field of Classification Search
CPC .................. G01S 13/767
(Continued)

(56) References Cited

U.S. PATENT DOCUMENTS

| 10,453,281 | B1 | 10/2019 | Lopez et al. |
| 2008/0290990 | A1 | 11/2008 | Schaffzin et al. |

(Continued)

FOREIGN PATENT DOCUMENTS

| CN | 107407717 | 11/2017 |
| CN | 110326157 | 10/2019 |

(Continued)

OTHER PUBLICATIONS

Zouari et al. "Relevant CIR Parameters selection for Fingerprinting Based Location Algorithm," 23rd International Conference on Software, Telecommunications and Computer Networks (SOFTCOM), Sep. 16, 2015, pp. 170-173.

(Continued)

*Primary Examiner* — William Kelleher
*Assistant Examiner* — Samarina Makhdoom
(74) *Attorney, Agent, or Firm* — Schwegman Lundberg & Woessner, P.A.

(57) ABSTRACT

It is provided a location determiner comprising: a first antenna; a radio signal modification device, wherein the radio signal modification device is configured to improve an ability to determine whether the portable key device is located on a back side or on a front side of the location determiner, based on obtaining a channel impulse response, CIR, of an impulse signal transmitted from the portable key device, wherein the location determiner is installable such that the back side is in a space being restricted by selectively unlockable a physical barrier and the front side is opposite the back side.

15 Claims, 8 Drawing Sheets

(58) Field of Classification Search
USPC .......................................................... 342/450
See application file for complete search history.

(56) References Cited

U.S. PATENT DOCUMENTS

| | | | | |
|---|---|---|---|---|
| 2012/0218076 | A1* | 8/2012 | Zacchio | G07C 9/00571 |
| | | | | 343/720 |
| 2013/0241694 | A1* | 9/2013 | Sharma | H01Q 9/0407 |
| | | | | 340/5.64 |
| 2016/0240023 | A1* | 8/2016 | Toivonen | H04B 7/086 |
| 2018/0061156 | A1* | 3/2018 | Einberg | G01S 3/18 |
| 2018/0213355 | A1* | 7/2018 | Smith | G01S 13/765 |
| 2019/0004155 | A1* | 1/2019 | Eber | G01S 7/4865 |
| 2019/0331781 | A1 | 10/2019 | McLauglin et al. | |
| 2020/0355790 | A1 | 11/2020 | Ahn et al. | |

FOREIGN PATENT DOCUMENTS

| | | | | |
|---|---|---|---|---|
| JP | | 2014173376 | 9/2014 | |
| KR | | 100867741 B1 * | 11/2008 | ............ B60J 5/0412 |
| WO | WO 2016/150911 | | 9/2016 | |
| WO | WO 2019/070520 | | 4/2019 | |
| WO | WO 2019/183053 | | 9/2019 | |
| WO | WO 2020/091686 | | 5/2020 | |

OTHER PUBLICATIONS

Official Action for Sweden Patent Application No. 2050675-4, dated Mar. 22, 2021, 7 pages.
Official Action for Sweden Patent Application No. 2050675-4, dated May 19, 2022, 5 pages.
International Search Report and Written Opinion for International (PCT) Patent Application No. PCT/EP2021/064676, dated Sep. 3, 2021, 17 pages.
Written Opinion of the International Preliminary Examining Authority for International (PCT) Patent Application No. PCT/EP2021/064676, dated Apr. 28, 2022, 6 pages.
International Preliminary Report on Patentability for International (PCT) Patent Application No. PCT/EP2021/064676, dated Sep. 9, 2022, 15 pages.
"CN App 202180041608.7 First Office Action with Search Report mailed Jul. 23, 2025", with English translation, 22 pages.

* cited by examiner

LOCATION DETERMINER

CROSS REFERENCE TO RELATED APPLICATIONS

This application is a national stage application under 35 U.S.C. 371 and claims the benefit of PCT Application No. PCT/EP2021/064676 having an international filing date of Jun. 1, 2021, which designated the United States, which PCT application claimed the benefit of Sweden Patent Application No. 2050675-4 filed Jun. 9, 2020, the disclosure of each of which are incorporated herein by reference.

TECHNICAL FIELD

The present disclosure relates to a location determiner, and in particular to facilitating determination of whether a portable key device is located on the front side or on a back side of the location determiner.

BACKGROUND

Locks and keys are evolving from the traditional pure mechanical locks. These days, there are wireless interfaces for electronic locks, e.g. by interacting with a portable key device. For instance, Radio Frequency Identification (RFID) has been used as the wireless interface.

When RFID is used, the user needs to present the portable key device in close proximity to a reader connected to the lock. Moreover, RFID requires a relatively large antenna in the reader by the lock and uses a large amount of energy. Significantly, RFID requires a user to actively take out the portable key device (e.g. RFID card or NFC (Near Field Communication) enabled smartphone) and bring it to be within centimetres of the lock. This is inconvenient and potentially insecure, since it is easier for an attacker to steal the portable key device when it is presented to the lock for the access control.

By using other short-range wireless communication with slightly longer communication range, e.g. Bluetooth Low Energy (BLE), Bluetooth or ultra-wideband (UWB), the portable key device can stay in a pocket or handbag and still be used for access control. However, the increased range also causes new problems. One problem which occurs if the lock unlocks whenever an authorised portable key device is within range, is that when a person on the inside of an electronic lock walks past the electronic lock or hangs a coat on the inside, the electronic lock could unintentionally be unlocked, and anyone could gain access to the restricted physical space.

By determining if the portable key device (and thus the user) is on the inside or the outside, the automatic access control can still be used, but a person on the inside will not trigger the unlock procedure.

However, the determination of whether the portable key device is on the inside or the outside needs to be reliable.

SUMMARY

One object is to enable improved reliability for determining whether a portable key device is located on a front side or back side of a location determiner.

According to first aspect, it is provided a location determiner comprising: a first antenna; a radio signal modification device, wherein the radio signal modification device is configured to improve an ability to determine whether the portable key device is located on a back side or on a front side of the location determiner, based on obtaining a channel impulse response, CIR, of an impulse signal transmitted from the portable key device, wherein the location determiner is installable such that the back side is in a space being restricted by selectively unlockable a physical barrier and the front side is opposite the back side.

The radio modification device may be configured to enhance an asymmetry in CIR reception between when the portable key device is located in the back side and when the portable key device is located the front side.

The location determiner may further comprise a metal plate on the back side of the first antenna. The metal plate can be a ground plane part of an antenna assembly also comprising the first antenna. Alternatively or additionally, the metal plate can be the physical barrier when this is a metal door.

The location determiner may further comprise a second antenna.

The radio signal modification device may be implemented by a radio asymmetry device configured to increase a difference in how a ultra-wideband, UWB, impulse signal is received by the first antenna and the second antenna, when the UWB impulse signal is transmitted from the back side of the location determiner.

The radio asymmetry device may be implemented by the metal plate being provided such that a centre of the metal plate is provided closer to the first antenna than the second antenna.

The radio asymmetry device may comprise an edge wave guide provided by an edge of the metal plate, the edge being closer to the first antenna than the second antenna, whereby the edge wave guide is configured to increase a signal level of the UWB impulse signal at the first antenna more than at the second antenna.

The radio asymmetry device may comprise a first peripheral wave blocker provided in contact with an edge of the metal plate, the edge being closer to the first antenna than the second antenna, whereby the first peripheral wave blocker is configured to increase path length of the UWB impulse signal to the first antenna compared to the path length to the path length to the second antenna.

The radio asymmetry device may comprise a second peripheral wave blocker provided in contact with a section of a second edge of the metal plate, the section being closer to the first antenna than the second antenna.

The radio asymmetry device may comprise central wave blocker provided between the first antenna and the second antenna.

The radio signal modification device may be implemented by a radio wave diffuser, wherein the radio wave diffuser is configured to diffuse the UWB impulse signal when received by the first antenna from the back side more than the UWB impulse signal is diffused when received by the first antenna from the front side.

The radio wave diffuser may comprise a radio frequency, RF, absorber made of RF radiation-absorbent material.

The RF absorber may be provided such that deflection of an UWB impulse signal from the back side around the metal plate to the first antenna is reduced.

The RF absorber may be provided on the back side of the metal plate.

The RF absorber may extend beyond the edges of the metal plate, when viewed from a direction perpendicular to the metal plate.

The RF absorber may be provided peripherally to the metal plate, in the main plane of the metal plate.

The RF absorber may be a radio asymmetry device configured to increase a difference in how the UWB impulse signal is received by the first antenna and the second antenna, when the UWB impulse signal is transmitted from the back side of the location determiner.

The radio wave diffuser may comprise a plurality of edge wave guides respectively provided by opposite edges of the metal plate and a centre wave guide provided on the front side of and centred between the first antenna and the second antenna.

The radio wave diffuser may comprise a rectangular-shaped metal plate provided parallel to the metal plate, in front of the first antenna and the second antenna, where an aperture in the centre of rectangular-shaped metal plate provides line-of-sight reception of the UWB impulse signal from the front side.

The location determiner may further comprise an outer wave blocker attached to the outer edges of the rectangular-shaped metal plate, wherein the outer wave blocker is angled towards the back side from the rectangular-shaped metal plate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein determine when a portable key device is located on a front side or on a back side in relation to a barrier (e.g. a door), based on a channel impulse response (CIR). An impulse is transmitted by the portable key device and the CIR is received by an antenna of a location determiner. The location determiner also comprises a radio signal modification device, and the location determiner is provided on the back side (inside) of the barrier. The radio signal modification device is configured such that it improves the ability to determine whether the portable key device is located on the back side or the front side (outside) of the barrier by increasing asymmetries in reception of CIR by one or more antennas. This allows a convenient and reliable determination of front side or back side, allowing access control e.g. to be performed only when the portable key device is on the front side (i.e. outside) of the barrier.

Figure 1:
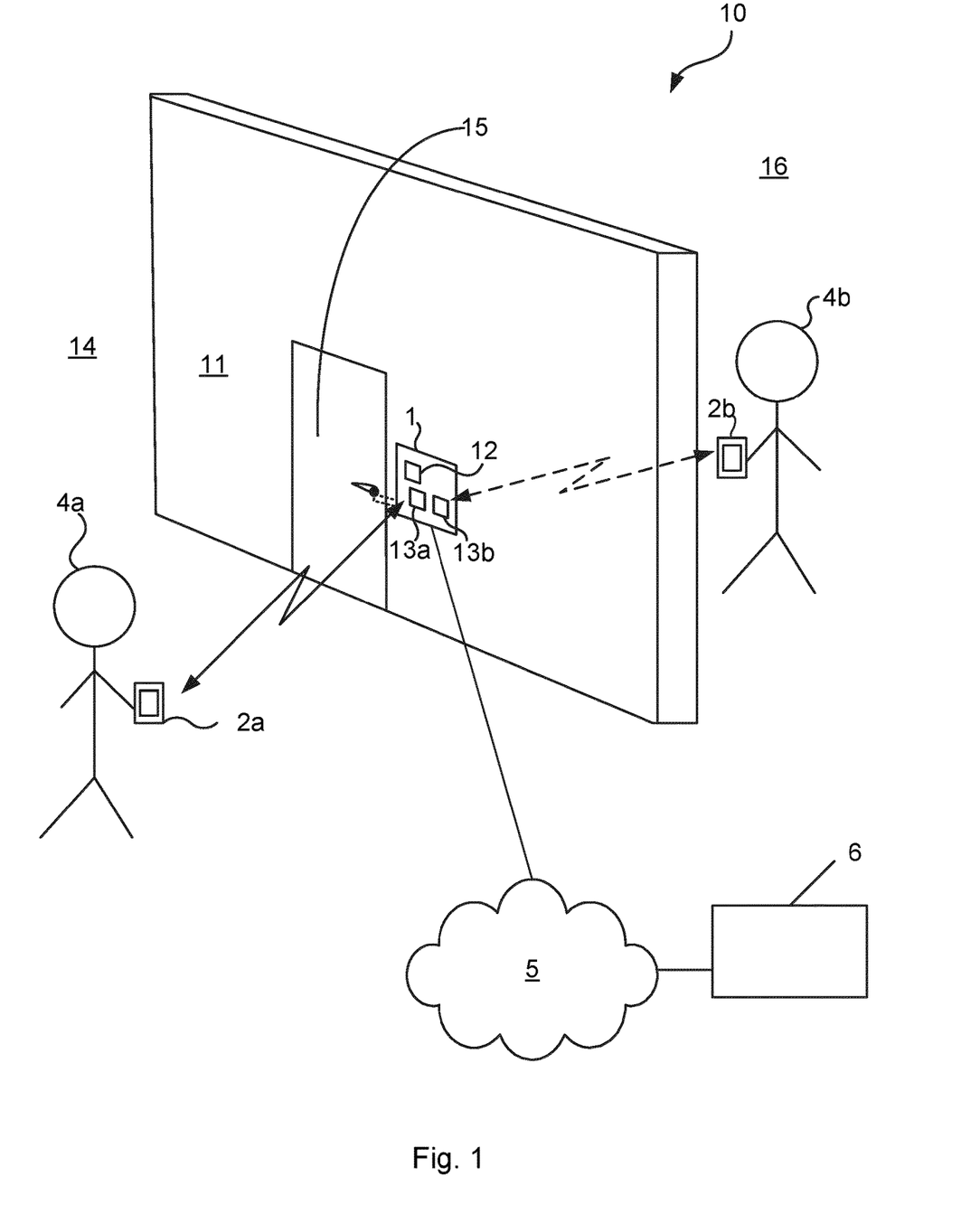
FIG. 1 is a schematic diagram showing an electronics access control system being an environment in which embodiments presented herein can be applied.

FIG. 1 is a schematic diagram showing an electronics access control system 10 being an environment in which embodiments presented herein can be applied. Access to a back side 16 of a location determiner 1 is restricted by a physical barrier 15, which is selectively unlockable. The physical barrier 15 stands between the back side 16 of the location determiner and a front side 14 of the location determiner. The back side 16 of the location determiner 1 is restricted physical space and the front side 14 of the location determiner 1 is an accessible physical space. In other words, the location determiner is installable such that the back side 16 (of the location determiner) is in a space being restricted by selectively unlockable a physical barrier 15 and the front side 14 is opposite the back side 16. Note that the front side 14 of the location determiner 1 can be a restricted physical space in itself, but in relation to this particular location determiner 1 the front side 14 of the location determiner is accessible. In other words, the back side 16 of the location determiner 1 is inside the physical barrier 15 and the front side 14 of the location determiner is outside the physical barrier 15. The barrier 15 can be a door, gate, hatch, window, drawer, etc. The barrier 15 can e.g. be a metal door, such as a fire door or security door. A handle 17 or doorknob is provided to allow opening of the barrier 15, once unlocked. The door could alternatively be opened using a motorised door opener. In order to unlock or lock the barrier 15, an electronic lock 12 is provided. The electronic lock 12 can be in an unlocked state or locked state. The electronic lock 12 can be separate from, but connected to, the location determiner 1 (as shown) or can form part of the location determiner 1 (not shown). In one embodiment, the location determiner 1 also comprises the electronic lock 12. The barrier 15 is provided in a surrounding fixed structure 11, such as a wall, fence or vehicle.

The location determiner 1 comprises one or more antennas 13a-b. Each antenna is fixedly mounted in relation to the electronic lock 12. Each antenna can be a directional antenna, where gain varies depending on direction of reception or transmission. For instance, each antenna can be a patch antenna or other antenna with a ground plane provided behind the radiating element(s). In this way, variations in type and size of material behind the antenna has minimal or no effect on antenna characteristics. When implemented as directional antenna, the antenna(s) face the front side 14 of the location determiner 1. This implies that the antenna(s) 13 have line-of-sight with portable key devices in the front side 14 of the location determiner. Line-of-sight is to be interpreted as line of sight in terms of radio signal propagation. In other words, there may be a thin plastic cover or similar protecting the antenna(s) 13 from the space on the front side 14 of the location determiner 1. In fact, the portable key device can even be in a back pocket or similar, in which case there is a body between the portable key device and the antenna(s). The direction that the antennas 13a, 13b is facing is the direction in which reception and transmission of signals occur best. Hence, when the antenna(s) are directional antenna(s), the maximum gain of the antenna(s) faces the front side 14. This can e.g. be achieved with metal plate, such as a ground plane or other metal plate (e.g. forming part of a door), provided on the opposite side (the back side) of the antennas, see below.

The location determiner 1 is used to determine whether any portable key devices, such as a first portable key device 2a and a second portable key device 2b in the vicinity of the electronic lock 12 is located on the front side 14 or the back side 16 of the location determiner 1. This determination is based in relation to the location determiner 1 and can e.g. be based on UWB (ultra-wideband) technology. UWB provides great accuracy of device positioning but at the cost of relatively large energy usage. Alternatively or additionally, the positioning module 13 can be based on other positioning technologies.

The electronic lock 12 is able to receive and send signals from/to portable key devices 2a-b over a communication channel which may be a short-range wireless interface. The electronic lock 12 can use the same antennas 13a-b that are used by the location determiner 1 for the short-range wireless interface.

Optionally, the electronic lock 12 comprises a separate unit, also known as an access control reader, for communicating with the portable key devices 2a-b and evaluating access. In this example, there is a first portable key device 2a and a second portable key device 2b. The portable key devices 2a-b are implemented using any suitable device which is portable by a user and which can be used by the electronic lock 12 to evaluate whether to grant access or not by communicating over the communication channel. The portable key devices can comprise digital cryptographic keys for electronic authentication.

The portable key devices 2a-b are typically carried or worn by a user and may be implemented as a smart phone, wearable device, key fob, etc. In this example, the first portable key device 2a is carried by a first user 4a and the second portable key device 2b is carried by a second user 4b. The first user 4a and the first portable key device 2a are located on the front side 14 of the location determiner 1 (i.e. outside the electronic lock 12) and the second user 4b and the second portable key device 2b are located on back side 16 of the location determiner (i.e. inside the electronic lock 12).

The short-range wireless interface between the portable key devices 2a-b and the electronic lock 12 is a radio frequency wireless interface and could e.g. employ Bluetooth Low Energy (BLE), Bluetooth, ZigBee, Radio Frequency Identification (RFID), any of the IEEE 802.11 standards, any of the IEEE 802.15 standards, etc. Using the communication channel, the portable key devices 2a-b can be authenticated and authorisation determination (access control) can be performed by the electronic lock 12 or the access control reader. The communication over the short-range wireless interface can be encrypted.

When the access control by the electronic lock 12 results in granted access, the electronic lock 12 is set in an unlocked state. When the electronic lock 12 is in the unlocked state, the barrier 15 can be opened and when the electronic lock 12 is in a locked state, the barrier 15 cannot be opened. In this way, access to the back side 16 of the location determiner 1 is controlled by the electronic lock 12. It is to be noted that the electronic lock 12 can be mounted in the fixed structure 11 by the physical barrier 15 (as shown) or in the physical barrier 15 itself (not shown).

The electronic lock 12 can perform an access control for any portable key device 2a-b presented to it. However, according to embodiments presented herein, access can only be granted after the portable key device 2a is determined to be on the front side 14 of the location determiner. The reason for this is that if access is granted by the electronic lock 12 whenever a portable key device is within communicable range, the second portable key device 2b in the restricted physical space 16 (i.e. on the inside) can result in the electronic lock 12 unlocking when the second user 4b walks by, without intending to unlock the electronic lock 12 to open the barrier. An unauthorised person could then open the barrier 15 and gain access to the restricted physical space 16.

The electronic lock 12 optionally contains communication capabilities to connect to a server 6 for the electronics access control system 10 via a network 5. The network can be a wide area network, such as the Internet, to which the portable key devices 2a-b can connect e.g. via WiFi (e.g. any of the IEEE 802.11x standards) or a cellular network, e.g. LTE (Long Term Evolution), next generation mobile networks (fifth generation, 5G), UMTS (Universal Mobile Telecommunications System) utilising W-CDMA (Wideband Code Division Multiplex), etc.

Figure 2A:
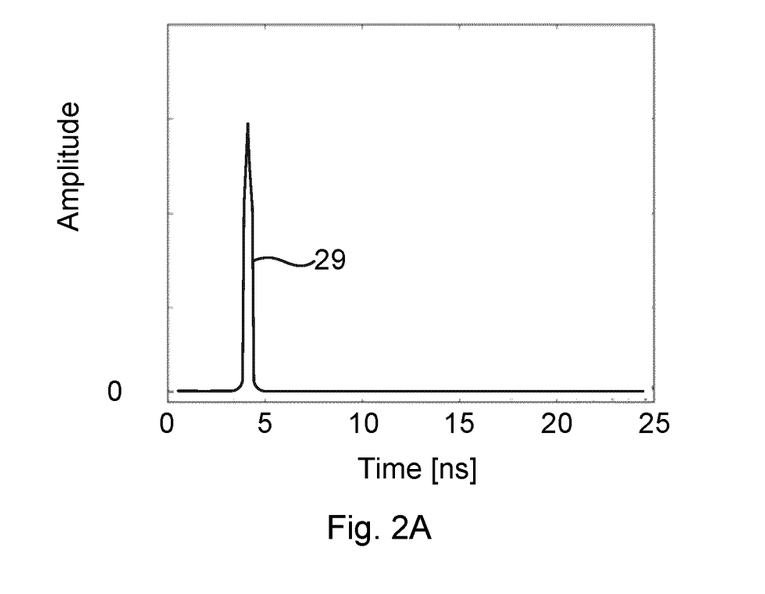
FIGS. 2A-B are schematic graphs illustrating an impulse signal from a portable key device and a corresponding channel impulse response.
Figure 2B:
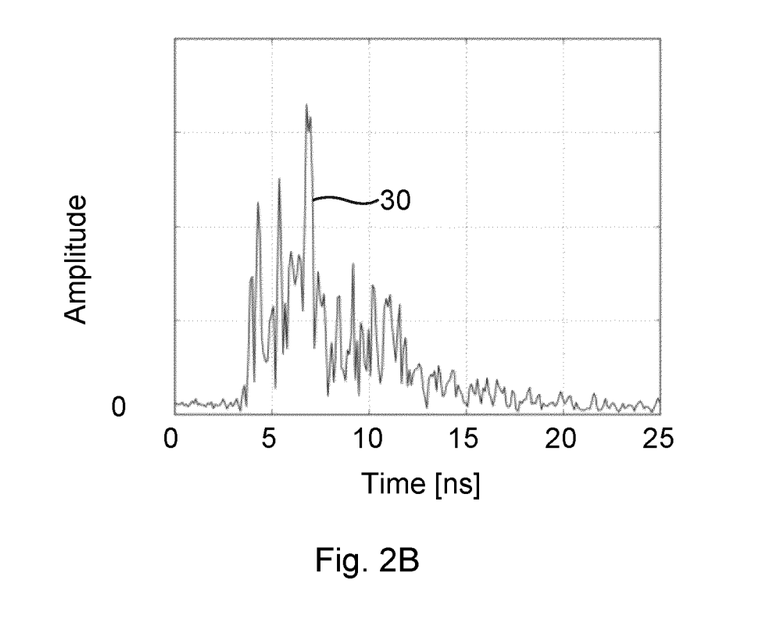

FIGS. 2A-B are schematic graphs illustrating an UWB impulse signal 29 from a portable key device 2a, 2b and a corresponding channel impulse response (CIR). The horizontal axis represents time and the vertical axis represents amplitude.

In FIG. 2A, the UWB impulse signal 29 from the portable key device is shown, in the form it is generated and transmitted from the portable key device. The UWB impulse signal 29 can be transmitted by the portable key device based on a command triggered by the location determiner.

In FIG. 2B, a CIR 30 is shown. The CIR 30 is how the UWB impulse signal 29 is received, in this case by one of the antennas 13a, 13b of the location determiner. Due to attenuation, reflection, absorption, antenna shape and other radio environment factors, the CIR 30 differs in shape from the UWB impulse signal 29.

Since the radio environment factors differ significantly if the UWB impulse signal is received from the front side 14, in a line-of-sight situation, and if the UWB impulse signal is received from the back side 16, the CIR can be used to determine if the transmitter of the UWB impulse signal 29, i.e. a portable key device, is located on the front side 14 or the back side 16 of the location determiner.

Figure 3A:
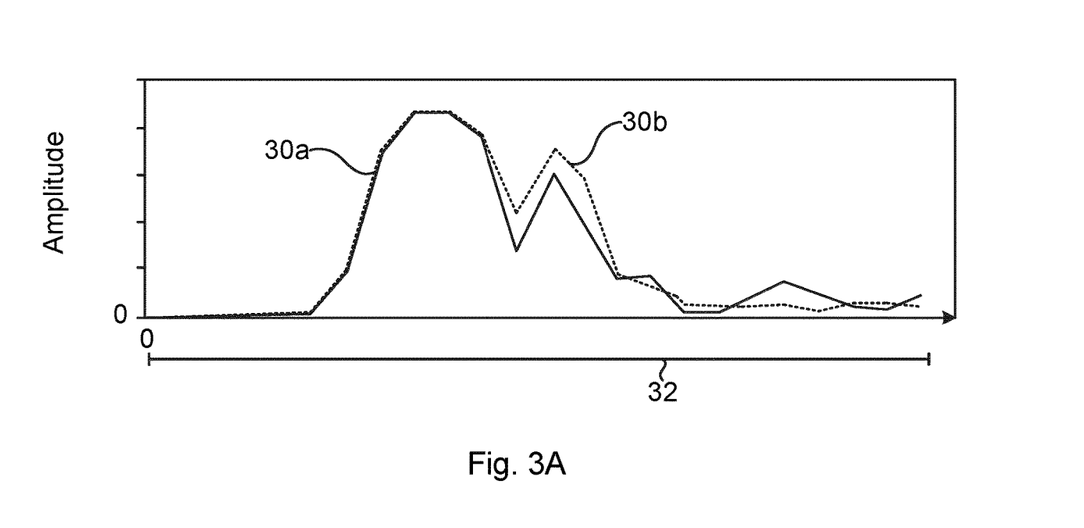
FIGS. 3A and 3B are schematic graphs illustrating how the CIR differs between different antennas.
Figure 3B:
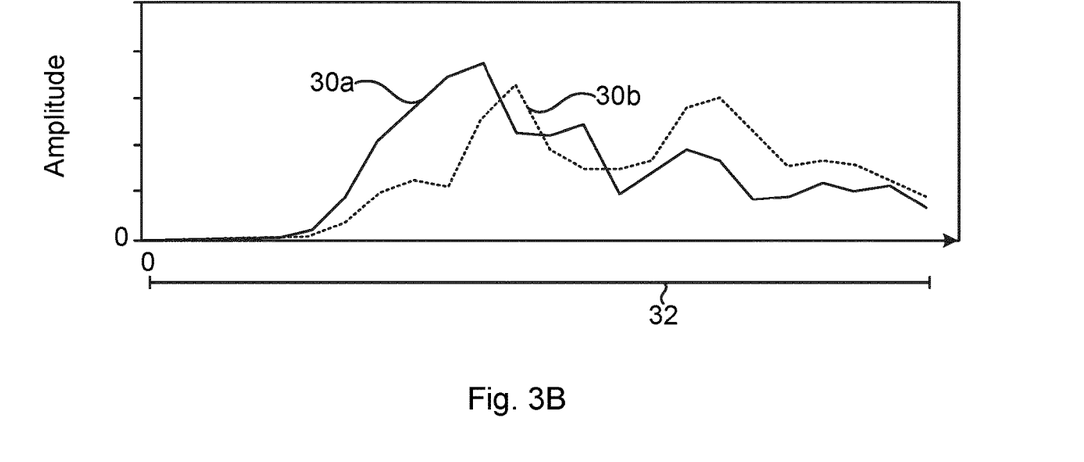

FIGS. 3A and 3B are schematic graphs illustrating how the CIR is received by two different antennas. A first CIR 30a is shown, being the envelope of the signal received by a first antenna. A second CIR 30b is shown, being the envelope of the signal received by a second antenna.

In FIG. 3A, the first CIR 30a and the second CIR 30b are shown based on the portable key device transmitting the UWB impulse signal 29 from the front side 14. It can be seen how the first CIR 30a and the second CIR 30b are very similar and follow each other very well over a measurement period 32. When the UWB impulse signal 29 is received from the front side 14, there is line-of-sight to the antennas. In this case, the difference between the CIR shapes for the two antennas is very small. Moreover, the signal amplitude for both CIRs 30a-b falls down relatively quickly.

In FIG. 3B, the first CIR 30a and the second CIR 30b are shown based on the portable key device transmitting the UWB impulse signal from the back side 16. In this case, the radio signal will experience different radio environments, and is affected differently by reflection and absorption, resulting in a significant difference between the shapes of the first CIR 30a and the second CIR 30b. Additionally, the CIRs are more diffuse over time here, compared to the front side example of FIG. 3A. According to embodiments presented herein, the location determiner further comprises a radio signal modification device that is configured to improve an ability to determine whether the portable key device 2a, 2b is located on the front side 14 or on a back side 16 of the location determiner. This is achieved by the radio modification device enhancing an asymmetry in CIR reception between when the portable key device is located in the back side and when the portable key device is located the front side, applicable for both a single-antenna case and for multiple antennas.

When the UWB impulse signal 29 is received from the front side, there is line-of-sight to both antennas 13a, 13b, in which case the difference between the CIR shapes for the two antennas 13a, 13b is very small, as seen in FIG. 3A. On the other hand, when the UWB impulse signal is received from the back side of the location determiner, the radio signal will experience different radio environments, and is affected differently by reflection and absorption, resulting in a significant difference between the CIR shapes 30a, 30b for the two antennas 13a, 13b as seen in FIG. 3B. In this way, the location determiner 1 can deduce that the portable key device is on the front side 14 if the difference between the CIR shapes for the two antennas 13a, 13b is less than a threshold and the portable key device is on the back side if the difference between the CIR shapes 30a, 30b for the two antennas 13a, 13b is greater than a threshold. The difference can e.g. be determined as an area between the envelopes of the two CIRs or a measurement of correlation between the two CIR shapes 30a, 30b.

The reliability of this determination is increased if the difference between the CIRs for the two antennas 13a, 13b are increased when the UWB signal is received from a portable key device on the back side 16. Hence, in some embodiments, the radio signal modification device comprises a radio asymmetry device configured to increase a difference in how the UWB impulse signal 29 is received by the first antenna 13a and the second antenna 13b. Embodiments of such a radio asymmetry device are shown in FIGS. 4A-B, FIG. 5, FIGS. 6A-B and FIG. 7, and are described below.

Another way for the location determiner 1 to determine when the portable key device is located on the front side 14 or the back side 16 of the location determiner is based on the shape of a single CIR 30a, 30b, from either (or both) of the antennas 13a, 13b. Specifically, when the UWB impulse signal 29 is received from the front side 14, there is line-of-sight to both antennas 13a, 13b, in which case the CIR corresponds better to the UWB impulse signal 29 than when the UWB impulse signal 29 is received from the back side 16. In other words, the CIR 30a, 30b for when the portable key device is on the back side 16 is diffused, as seen in FIG. 3B, and does not have as sharp of a peak as when the CIR 30a, 30b for when the portable key device is on the front side 14 as seen in FIG. 3A. Hence, in some embodiments, the radio signal modification device comprises a radio wave diffuser that is configured to diffuse the UWB impulse signal 29 when received from the back side 16 more than the UWB impulse signal 29 is diffused when received from the front side 14. This improves the reliability of the determination of when the portable key device is located on the front side 14 of the location determiner 1 and when the key device is located on the back side 16 of the location determiner 1. Embodiments of such a radio wave diffuser are shown in FIGS. 9A-B, FIGS. 10A-B, FIG. 13 and FIGS. 14A-B, and are described below.

Embodiments of a radio signal modification device being both a radio asymmetry device and a radio wave diffuser are shown in FIGS. 11A-B and FIGS. 12A-B and are described below.

Figure 4A:
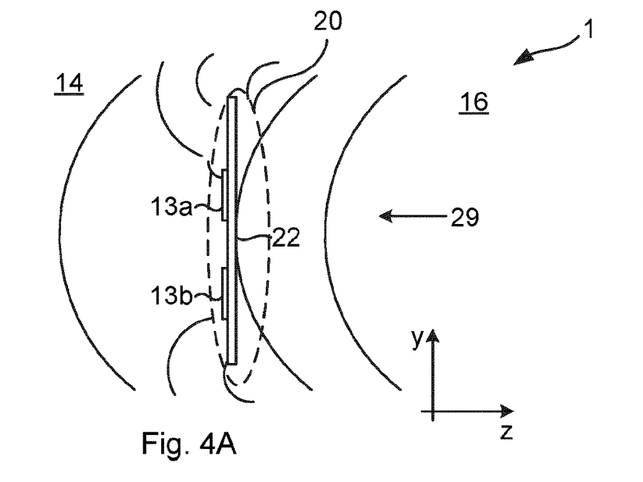
FIGS. 4A-B are schematic diagrams illustrating an embodiment where a radio signal modification device of the location determiner implemented by a radio asymmetry device comprising an asymmetrically placed ground plane.
Figure 4B:
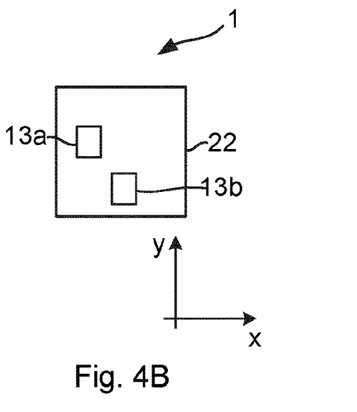

FIGS. 4A-B are schematic diagrams illustrating an embodiment where a radio signal modification device of the location determiner 1 comprises a radio asymmetry device comprising an asymmetrically placed ground plane. An UWB impulse signal 29 is here illustrated as transmitted from the back side 16. Schematic waves are shown as curved lines to illustrate wave propagation.

In this embodiment, the radio asymmetry device 20 is implemented by the metal plate 22 being provided such that a centre of the metal plate 22 is provided closer to the first antenna than the second antenna. The metal plate 22 can e.g. be a ground plane (e.g. of copper) or metal door (e.g. containing steel) behind the antennas 13a-b.

This blocks more radio waves by the first 13a than the second antenna 13b, which enhances the asymmetry in receiving the UWB impulse signal from the back side of the location determiner.

In FIG. 4A, it is illustrated how the asymmetry is achieved by an offset between the metal plate 22 and the two antennas 13a-b in a y-direction. Additionally or alternatively the asymmetry is achieved by an offset between the metal plate 22 and the two antennas 13a-b in an x-direction, as illustrated in FIG. 4B.

Figure 5:
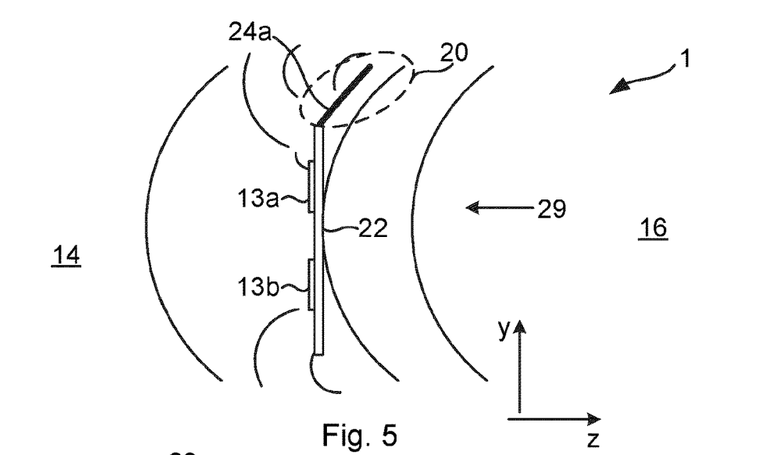
FIG. 5 is a schematic diagram illustrating a radio signal modification device of the location determiner implemented by a radio asymmetry device comprising an edge wave guide.

FIG. 5 is a schematic diagram illustrating a radio signal modification device of the location determiner implemented by a radio asymmetry device 20 comprising a first peripheral wave blocker 24a.

The first peripheral wave blocker 24a is provided in contact with an edge of the metal plate 22 by the first antenna. In other words, the first peripheral wave blocker 24a is then provided in contact with the edge being closer to the first antenna 13a than the second antenna 13b, i.e. the upper edge in FIG. 5. The first wave blocker 24a forces radio waves to go around the first wave blocker 24a, to reach the first antenna 13a. In other words, the first peripheral wave blocker 24a is configured to increase path length of the UWB impulse signal 29 to the first antenna compared to the path length to the second antenna. The first peripheral wave blocker 24a can be made of copper. The first peripheral wave blocker 24a can be angled toward the back side 16 of the location determiner 1 to increase its radio wave blocking ability for UWB impulse signals from the back side 16 of the location determiner 1.

Figure 6:
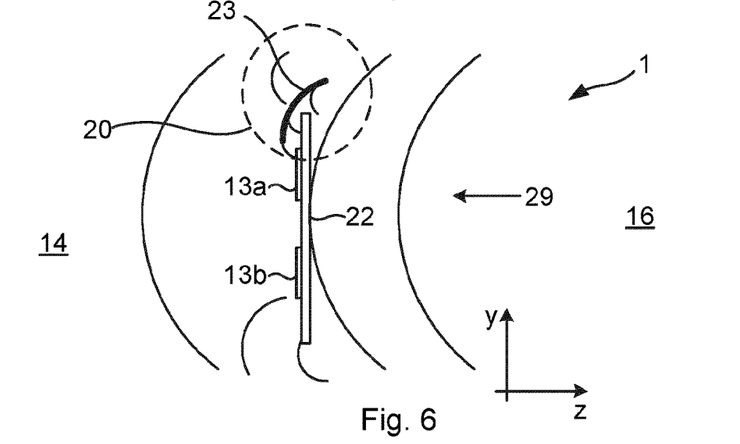
FIG. 6 is a schematic diagram illustrating a radio signal modification device of the location determiner implemented by a radio asymmetry device comprising a first peripheral wave blocker.

FIG. 6 is a schematic diagram illustrating a radio signal modification device of the location determiner implemented by a radio asymmetry device 20 comprising an edge wave guide 23.

As in many embodiments presented herein, the location determiner 1 comprises a common ground plane 22 behind both the first antenna 13a and the second antenna 13b. The ground plane 22 can be a rectangular metal plate (e.g. made of copper). In one embodiment, the radio asymmetry device 20 is implemented by the ground plane being provided such that a centre of the ground plane is shifted, thus being provided closer to the first antenna 13a than the second antenna 13b.

In the embodiment shown in FIG. 6, the radio asymmetry device 20 comprises an edge wave guide 23 provided by an edge of the ground plane 22, being an edge being closer to the first antenna 13a than the second antenna 13b. In this way, the edge wave guide 23 improves the reception at the first antenna, and is thus configured to increase a signal level of the UWB impulse signal 29 at the first antenna 13a more than at the second antenna 13b. The edge wave guide 23 can be made of metal, e.g. copper.

Figure 7A:
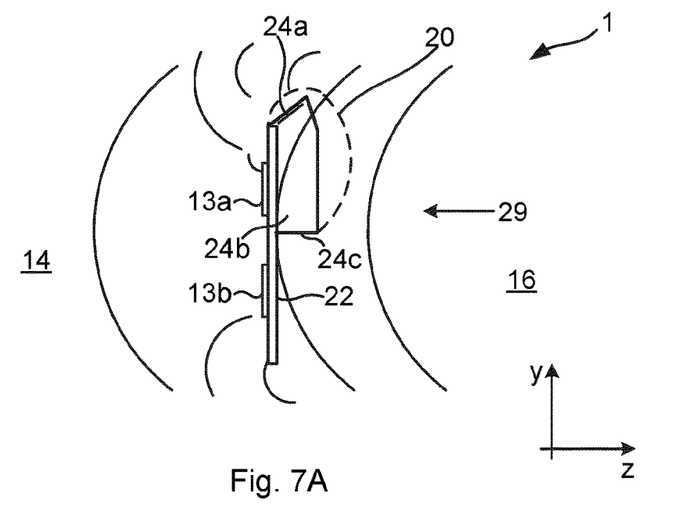
FIGS. 7A-B are schematic diagrams illustrating a radio signal modification device of the location determiner implemented by a radio asymmetry device comprising a plurality of peripheral wave blockers.
Figure 7B:
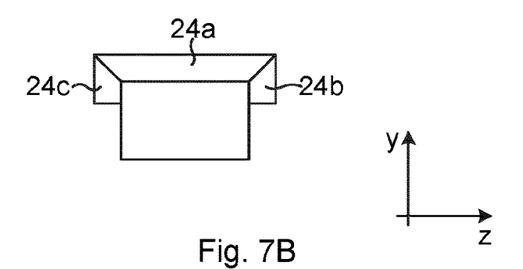

FIGS. 7A-B are schematic diagrams illustrating a radio signal modification device of the location determiner implemented by a radio asymmetry device 20 comprising a plurality of peripheral wave blockers 24a-c. FIG. 7A shows the peripheral wave blockers 24a-c from a side view and FIG. 7B shows the peripheral wave blockers 24a-c from a front view.

In this embodiment, in addition to the first wave blocker 24a, there is at least one other peripheral wave blocker. In this example, there are a second peripheral wave blocker 24b and third wave blocker 24c. These are provided at a section of the vertical edge (along the y axis) which is closer to the first antenna 13a, i.e. the upper section of FIG. 7A. In other words, the radio asymmetry device 20 comprises a second peripheral wave blocker 24b and a third peripheral wave blocker 24c, which are both provided in contact with a section of a second edge of the ground plane 22, the section being closer to the first antenna 13a than the second antenna 13b.

The addition of the additional peripheral wave blockers 24b-c have the same effect as the first peripheral wave blocker of FIG. 6, but increases the blocking to the first antenna 13a, whereby the asymmetry between the two antennas 13a-b is increased even more.

The additional peripheral wave blockers 24b-c can be made of metal, e.g. copper.

Figure 8:
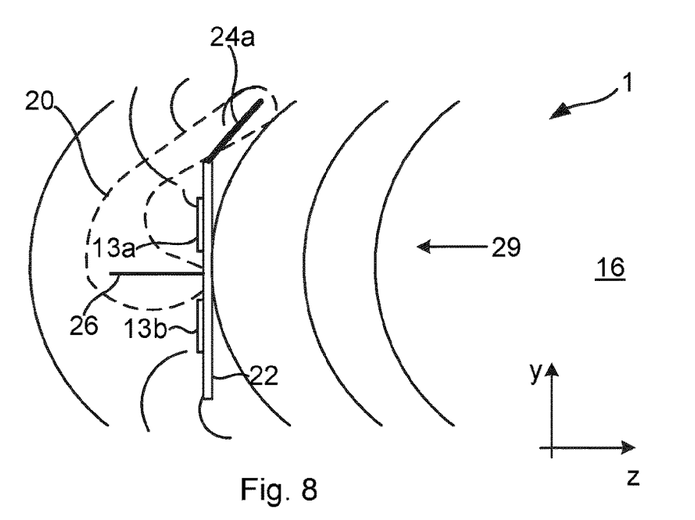
FIG. 8 is a schematic diagram illustrating a radio signal modification device of the location determiner implemented by a radio asymmetry device comprising a first peripheral wave blocker and a central wave blocker.

FIG. 8 is a schematic diagram illustrating a radio signal modification device of the location determiner implemented by a radio asymmetry device 20 comprising a first peripheral wave blocker 24a and a central wave blocker 26. The central wave blocker 26 is provided between the first antenna 13a and the second antenna 13b. The central wave blocker 26 can be made of metal, e.g. copper.

The central wave blocker 26 further reduces any UWB impulse signal from the back, which reaches the first antenna 13a, to also reach the second antenna. In this way, the asymmetry between the two antennas 13a-b is increased.

FIGS. 9A-B and FIGS. 10A-B are schematic diagrams illustrating a radio signal modification device of the location determiner implemented by a radio wave diffuser 18. In contrast to the embodiments illustrated by FIGS. 4-8, these embodiment (as well as the embodiments of FIGS. 11A-B, FIGS. 12A-B, FIG. 13 and FIGS. 14A-B) do not rely on asymmetry in of the CIR between the two antennas 13a-b. Instead, (or in addition to the asymmetry) the radio signal modification device is here implemented by the radio wave diffuser 18 that is configured to diffuse the UWB impulse signal 29 when received from the back side 16 more than the UWB impulse signal is diffused when received from the front side 14. Hence, asymmetry from the two sides is exploited and enhanced, but in a way that a single antenna can be used. Hence, the embodiments comprising the radio wave diffuser can be implemented using only one antenna. In the embodiments illustrated by FIGS. 9A-B and FIGS. 10A-B, the radio wave diffuser 18 comprises an RF absorber 35 made of RF radiation-absorbent material.

Figure 9A:
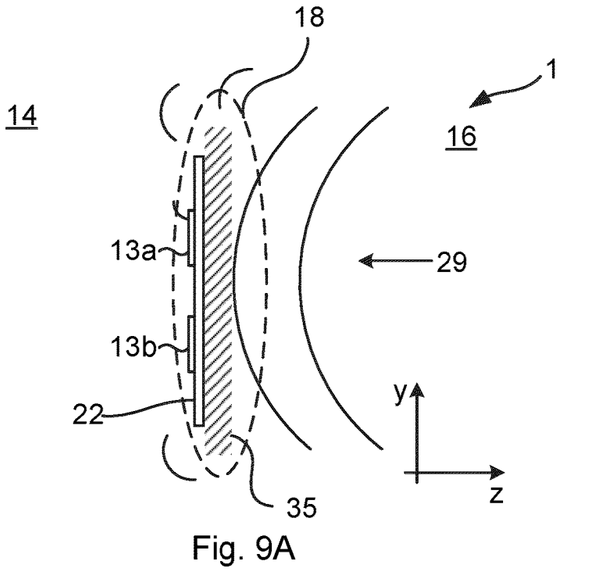
FIGS. 9A-B are schematic diagrams illustrating a radio signal modification device of the location determiner implemented by a radio wave diffuser comprising an RF (Radio Frequency) absorber on the back side.
Figure 9B:
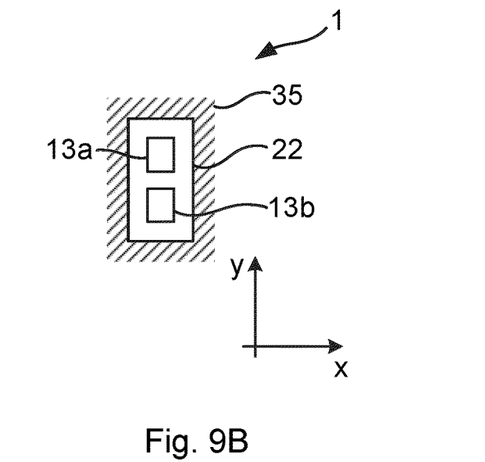

In FIG. 9A, it is illustrated how the RF absorber 35 is provided behind the ground plane 22, i.e. on the back side 16 of the radio wave diffuser 18. The RF absorber 35 can extend beyond the edges of the metal plate 22, when viewed from a direction perpendicular to the metal plate, i.e. peripherally past the ground plane 22 in an x- and y-direction, as illustrated in FIG. 9B, as well as in FIG. 9A.

Figure 10A:
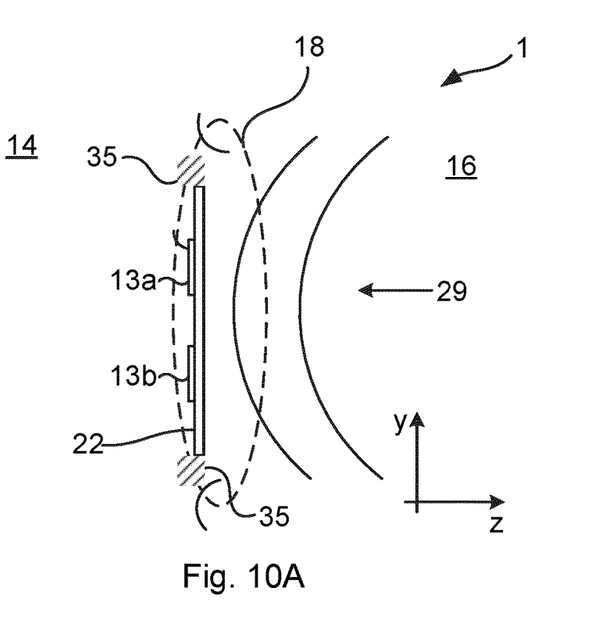
FIGS. 10A-B are schematic diagrams illustrating a radio signal modification device of the location determiner implemented by a radio wave diffuser comprising an RF absorber, provided peripherally to the ground plane.
Figure 10B:
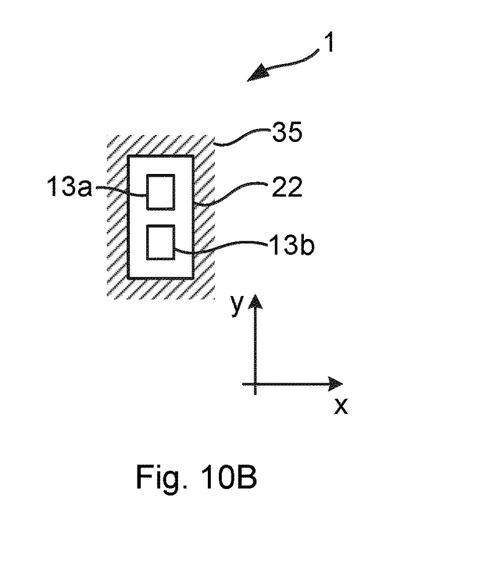

In FIGS. 10A-B, the RF absorber 35 is provided peripherally to the ground plane. The RF absorber 35 is thus provided around the ground plane 22. The RF absorber 35 is provided peripherally to the ground plane 22, in the main plane of the ground plane 22. In other words, the RF absorber 35 is provided outside (in the plane of the ground plane, i.e. the x-y plane here), but with no significant gap to (e.g. in contact with), the edges of the ground plane 22. In the direction perpendicular to the ground plane 22, i.e. the z-direction in the indicated co-ordinate system, and in relation to the ground plane 22, the RF absorber 35 can be provided completely on the front side 14, completely on the back side 16 or partly on the front side 14 and partly on the backside 16, as long as the RF absorber 35 leaves no significant gap to the ground plane in the plane (x-y) of the ground plane. A significant gap is here to be construed as a gap large enough to allow RF waves to pass through.

The RF absorber 35 illustrated in FIGS. 9A-B and FIGS. 10A-B effectively reduce the ability for the antenna(s) 13a-b to receive the UWB impulse signal 29 from the back side 16, while reception from the front side is very little affected. In this way, the first peak in the CIR is significantly diffused, which can be exploited for determining when the UWB impulse signal is received from the front side 14 or the back side 16. The RF absorber 35 is provided by the edges of the ground plane 22, whereby a deflection of an UWB impulse signal 29 from the back side 16 around the metal plate 22 to the first antenna 13a (and optionally the second antenna) is reduced.

Figure 11A:
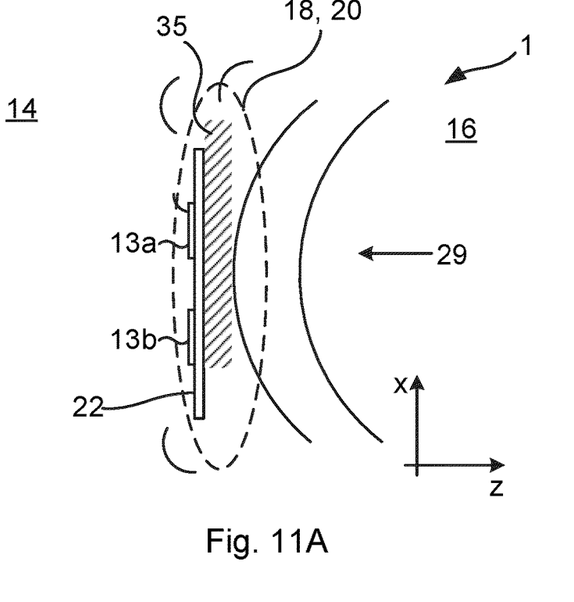
FIGS. 11A-B and FIGS. 12A-B are schematic diagrams illustrating a radio signal modification device of the location determiner implemented by an asymmetric radio wave diffuser.
Figure 11B:
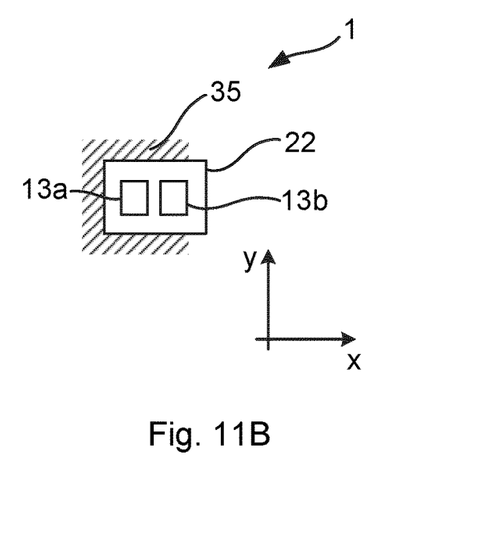

FIGS. 11A-B and FIGS. 11A-B are schematic diagrams illustrating a radio signal modification device of the location determiner implemented by an asymmetric radio wave diffuser 18. In other words, the radio signal modification device is both a radio wave diffuser and a radio asymmetry device. Also here, the radio wave diffuser 18 comprises an RF absorber 35. However, the RF absorber 35 is here a radio asymmetry device 20 configured to increase a difference in how the UWB impulse signal 29 is received by the first antenna 13a and the second antenna 13b, when the UWB impulse signal is transmitted from the back side of the location determiner.

Looking first to FIGS. 11A-B, the RF absorber 35 is provided in one rectangular piece, behind the ground plane 22. The RF absorber 35 can extend beyond the edges of the metal plate on three sides as shown in FIG. 11B. In this case, the RF absorber 35 extends beyond the edges of the metal plate 22 on all sides except the side that is closer to the second antenna than the first antenna.

Figure 12A:
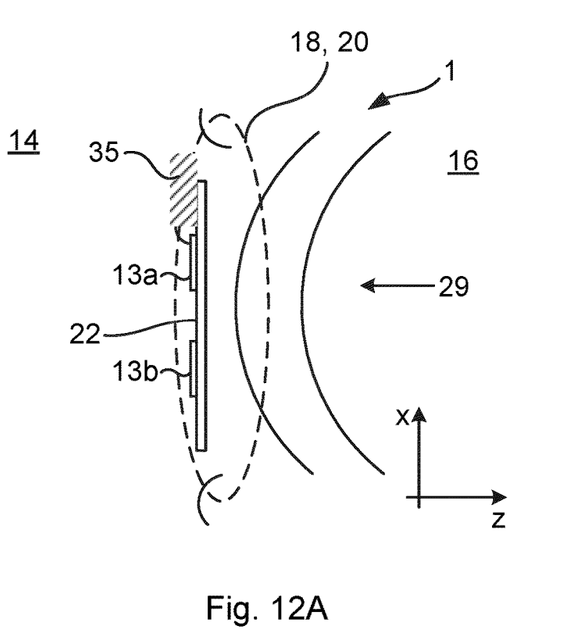
Figure 12B:
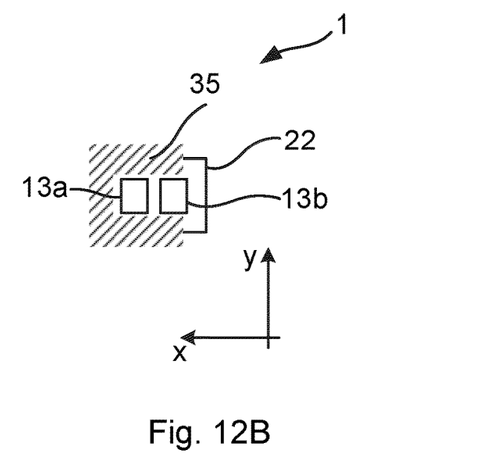

Looking now to FIGS. 12A-B, the RF absorber 35 is here provided in a U-shaped piece, in front of the ground plane 22. Also here, he RF absorber 35 can extend beyond the edges of the metal plate on three sides as shown in FIG. 12B. In this case, the RF absorber 35 extends beyond the edges of the metal plate 22 where it is provided, i.e. on all sides except the side that is closer to the second antenna than the first antenna.

In the embodiments of FIGS. 11A-B and FIGS. 12A-B, where the RF absorber is provided asymmetrically, it can be detected if an attacker is attempting to trick the system by providing an RF reflector in front of the location determiner. If the RF absorber 35 is provided symmetrically with regard to the antennas 13a-b, there is otherwise a risk that the UWB pulse transmitted from the back side 16 could be reflected back to the antennas 13a-b by the reflector, and the UWB pulse is considered to be transmitted from the front side 14. However, by providing the RF absorber 35 asymmetrically with regard to the pair of antennas 13a-b, the location determiner can consider both the diffusion of the UWB pulse and the asymmetry between the two antennas to determine when the UWB pulse is transmitted from the back side 16, which provides a secure determination of transmission side and is much more difficult for an attacker to get around.

Figure 13:
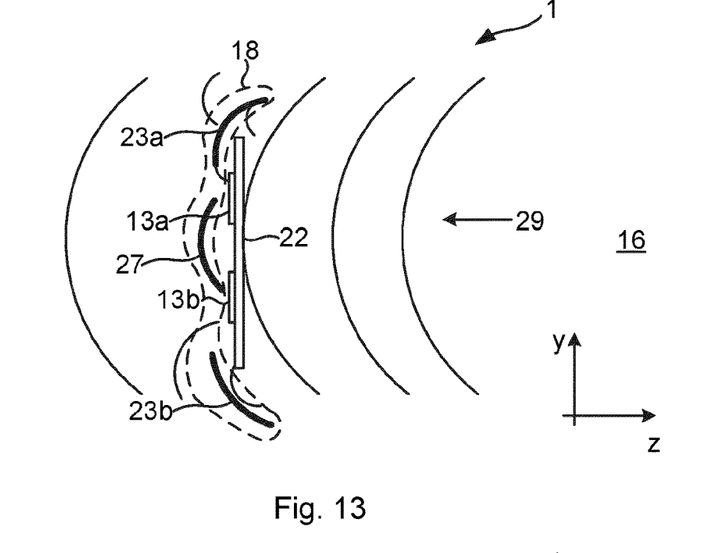
FIG. 13 is a schematic diagram illustrating a radio signal modification device of the location determiner, implemented by a radio wave diffuser comprising a plurality of edge wave guides and a centre wave guide.

FIG. 13 is a schematic diagram illustrating a radio signal modification device of the location determiner implemented by a radio wave diffuser 18 comprising a plurality of edge wave guides 23a, 23b and a centre wave guide 27.

The plurality of edge wave guides 23a, 23b are respectively provided by opposite edges of the ground plane 22 and a centre wave guide 27 provided on the front side of and centred between the first antenna 13a and the second antenna 13b. This arrangement of wave guides 23a, 23b diffuses UWB impulse signals from the back 16, while allowing signals from the front 14 to be received with minimal diffusion.

The edge wave guides 23a, 23b and the centre wave guide 27 can be made of metal, e.g. copper.

Figure 14A:
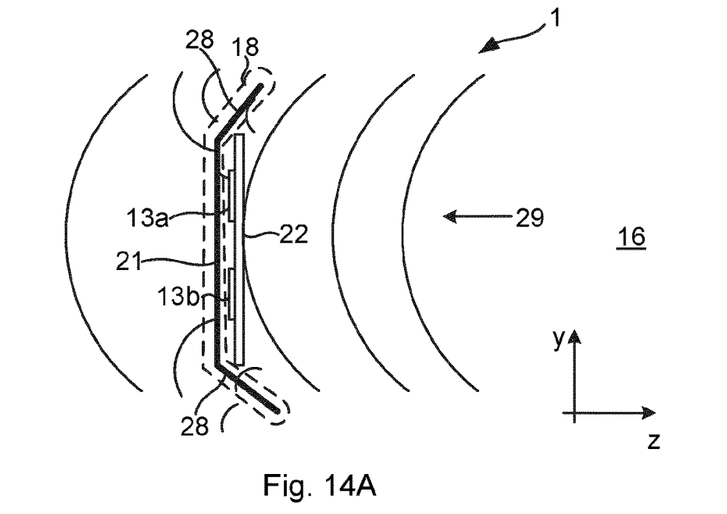
FIGS. 14A-B are schematic diagrams illustrating a radio signal modification device of the location determiner implemented by a radio wave diffuser comprising a rectangular-shaped metal plate and an optional outer wave blocker.
Figure 14B:
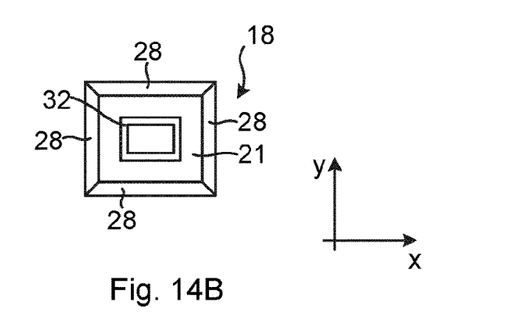

FIGS. 14A-B are schematic diagrams illustrating a radio signal modification device of the location determiner implemented by a radio wave diffuser 18 comprising a rectangular-shaped metal plate 21 and an optional outer wave blocker 28. FIG. 14A shows the radio wave diffuser 18 from a side view and FIG. 14B shows the radio wave diffuser 18 from a front view.

The rectangular-shaped metal plate 21 is provided parallel to the ground plane 22, in front of the first antenna 13a and the second antenna 13b. An aperture 32, seen in FIG. 14B, in the centre of rectangular-shaped metal plate 21 provides line-of-sight reception of the UWB impulse signal 29 from the front side 14.

The rectangular-shaped metal plate 21 significantly diffuses UWB impulse signals from the back 16, while allowing signals from the front 14 to be received with minimal diffusion.

Optionally, an outer wave blocker 28 is provided attached to the outer edges of the rectangular-shaped metal plate 21, wherein the outer wave blocker 28 is angled (as seen in FIG. 14A) towards the back side 16 from the rectangular-shaped metal plate 21. This outer wave blocker 28 further diffuses the rectangular-shaped metal plate 21.

The rectangular-shaped metal plate 21 and the outer wave blocker 28 can be made of metal, e.g. copper.

It is to be noted that any one of the embodiments illustrated in FIGS. 4A-B, FIG. 5, FIG. 6, FIG. 7 and FIG. 8 can also diffuse the UWB impulse signals.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A location determiner comprising:
a first antenna;
a second antenna;
a metal plate on the back side of the first antenna;
a radio signal modification device, wherein the radio signal modification device is configured to improve an ability to determine whether a portable key device is located on a back side or on a front side of the location determiner, based on obtaining a channel impulse response, CIR, of an impulse signal transmitted from the portable key device, wherein the location determiner is installable such that the back side is in a space being restricted by a selectively unlockable physical barrier and the front side is opposite the back side, wherein the radio signal modification device comprises a radio asymmetry device configured to increase a difference in how an ultra-wideband, UWB, impulse signal is received by the first antenna and the second antenna, when the UWB impulse signal is transmitted from the back side of the location determiner, wherein the radio asymmetry device is implemented by the metal plate being provided such that a centre of the metal plate is provided closer to the first antenna than the second antenna;

wherein both the first antenna and the second antenna face the front side; and wherein the radio asymmetry device comprises:
an edge wave guide provided by an edge of the metal plate, the edge being closer to the first antenna than the second antenna, whereby the edge wave guide is configured to increase a signal level of the UWB impulse signal at the first antenna more than at the second antenna; or
a first peripheral wave blocker provided in contact with an edge of the metal plate, the edge being closer to the first antenna than the second antenna, whereby the first peripheral wave blocker is configured to increase a path length of the UWB impulse signal to the first antenna compared to a path length of the UWB impulse signal to the second antenna.

2. The location determiner according to claim 1, wherein the radio modification device is configured to enhance an asymmetry in CIR reception between when the portable key device is located in the back side and when the portable key device is located in the front side.

3. The location determiner according to claim 1, wherein the radio asymmetry device comprises the first peripheral wave blocker and further comprises a second peripheral wave blocker provided in contact with a section of a second edge of the metal plate, the section being closer to the first antenna than the second antenna.

4. The location determiner according to claim 1, wherein the radio asymmetry device comprises the first peripheral wave blocker and further comprises a central wave blocker provided between the first antenna and the second antenna.

5. The location determiner according to claim 1, wherein each one of the first antenna and second antenna is a patch antenna.

6. The location determiner according to claim 1, wherein the radio signal modification device comprises a radio wave diffuser, wherein the radio wave diffuser is configured to diffuse the UWB impulse signal when received by the first antenna from the back side more than the UWB impulse signal is diffused when received by the first antenna from the front side.

7. The location determiner according to claim 6, wherein the radio wave diffuser comprises a radio frequency, RF, absorber made of RF radiation-absorbent material.

8. The location determiner according to claim 7, wherein the RF absorber is provided such that deflection of a UWB impulse signal from the back side around the metal plate to the first antenna is reduced.

9. The location determiner according to claim 7, wherein the RF absorber is provided on a back side of the metal plate.

10. The location determiner according to claim 9, wherein the RF absorber extends beyond edges of the metal plate.

11. The location determiner according to claim 8, wherein the RF absorber is provided peripherally to the metal plate, in a main plane of the metal plate.

12. The location determiner according to claim 8, wherein the RF absorber is a radio asymmetry device configured to increase a difference in how the UWB impulse signal is received by the first antenna and the second antenna, when the UWB impulse signal is transmitted from the back side of the location determiner.

13. The location determiner according to claim 6, wherein the radio wave diffuser comprises a plurality of edge wave guides respectively provided by opposite edges of the metal plate and a centre wave guide provided on the front side and centred between the first antenna and the second antenna.

14. The location determiner according to claim 6, wherein the radio wave diffuser comprises a rectangular-shaped metal plate provided parallel to the metal plate, in front of the first antenna and the second antenna, where an aperture in the centre of the rectangular-shaped metal plate provides line-of-sight reception of the UWB impulse signal from the front side.

15. The location determiner according to claim 14, further comprising an outer wave blocker attached to outer edges of the rectangular-shaped metal plate, wherein the outer wave blocker is angled towards the back side from the rectangular-shaped metal plate.

* * * * *